Aug. 20, 1963   A. G. LORBACHER   3,101,080
OUTDOOR GRILL
Filed July 29, 1960   2 Sheets-Sheet 1
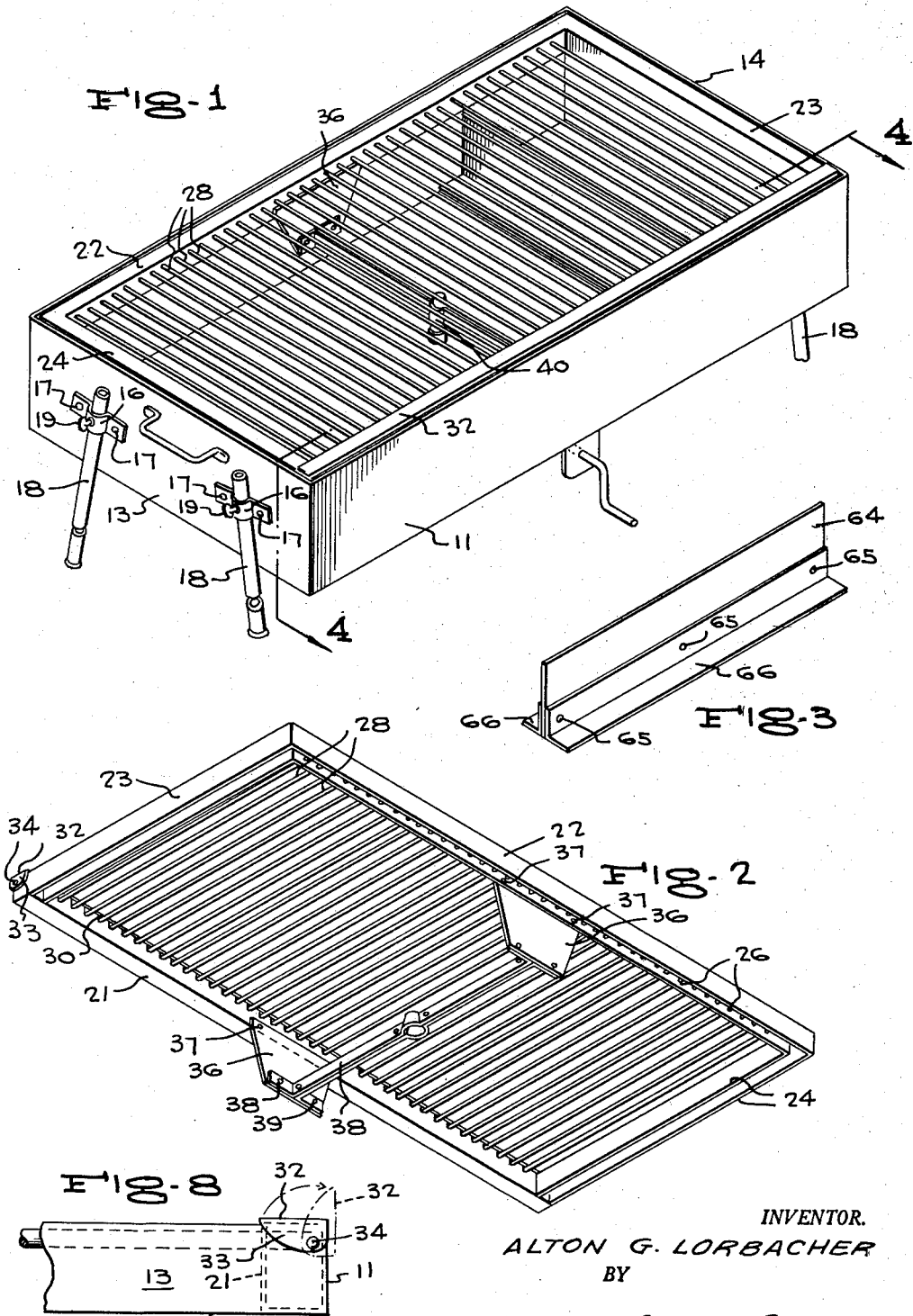
INVENTOR.
ALTON G. LORBACHER
BY
McMorrow, Berman & Davidson
ATTORNEYS

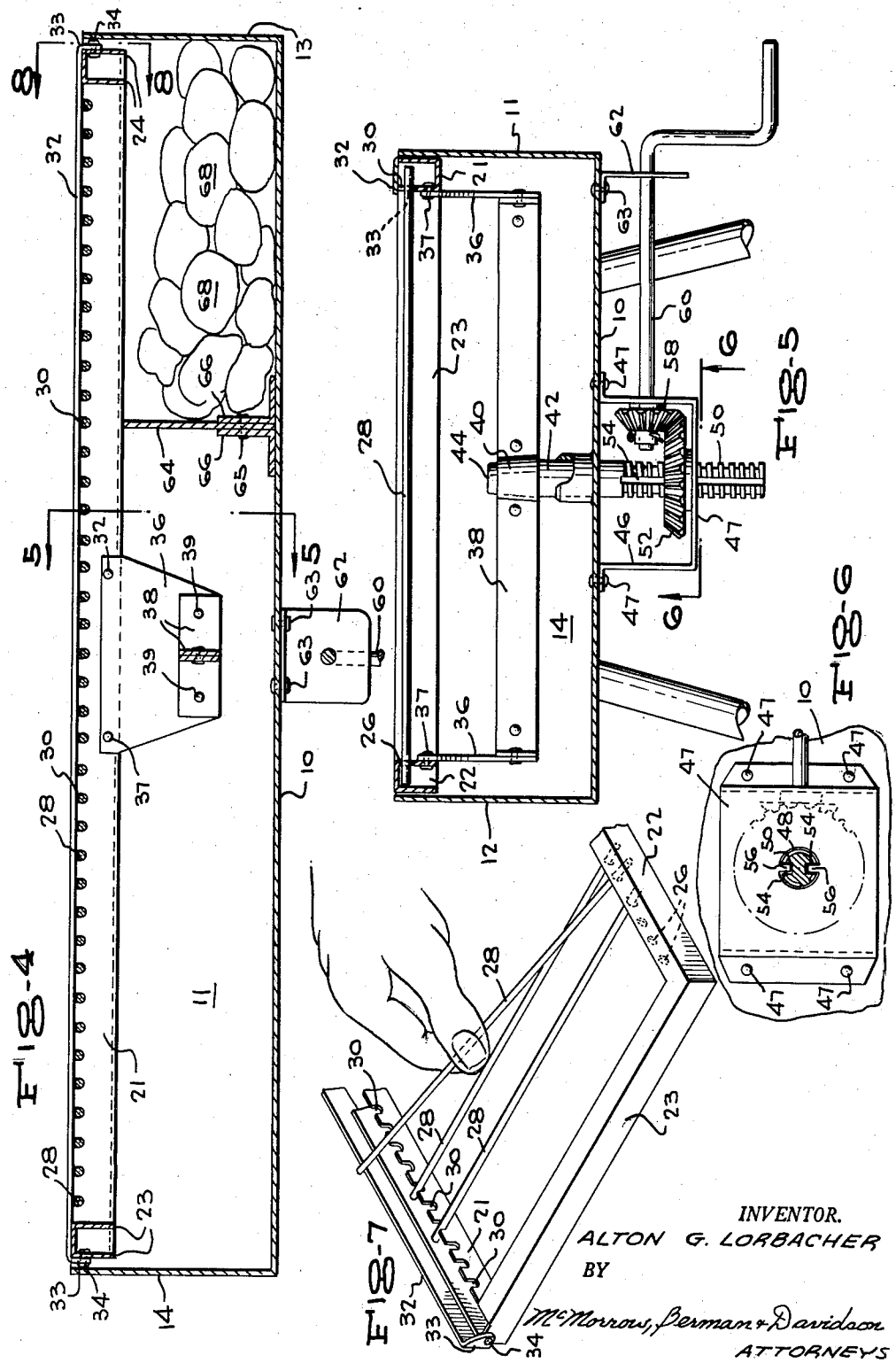

United States Patent Office 3,101,080
Patented Aug. 20, 1963

3,101,080
OUTDOOR GRILL
Alton G. Lorbacher, 306 E. Peace Place, Raleigh, N.C.
Filed July 29, 1960, Ser. No. 46,142
6 Claims. (Cl. 126—25)

This invention relates to cooking grills of the type commonly used for outdoor cooking over charcoal. With the accelerated growth in popularity of "cooking out" the need for improvement has become increasingly evident. In particular, grills, by their very natures, are so complex, structurally, that cleaning of the grills amounts to a major effort, troublesome in the extreme. On the other hand, the existing types are somewhat primitive from the standpoint of their functionality, and do not permit of efficient utilization of available heat or space. Regulation of heat for various cooking stages has also left much to be desired.

I have found that enumerated difficulties, as well as others, are obviated by my novel grill, by an arrangement which permits easy placement or removal of the grill rods, individually, and which includes a freely movable firebox divider by which the effective heating area may be concentrated and thus localized. In cooperation with these features the system also provides an adjusting mechanism for the grill rod assembly which is reliable and efficient in operation.

It is therefore a principal object of the invention to provide for easy cleaning and replacement of grid elements in a cooking device. A further and related object is to provide for selective adjustment of the extent of grid area, as well as to correlate the fuel bed therewith, and to readily adjust the grid height above the fuel. Other objects include the avoidance of undue shifting of the fuel and the maximum utilization of working space. A general object is to achieve all of the foregoing objects in a device which is low in cost, simple of structure, easy of manufacturing and repair, compact and easily portable.

These and other objects are attained by the invention, a preferred modification of which is described in the following specification, as illustrated in the drawings, in which:

FIGURE 1 is a perspective view of the grill assembly as a whole, with the supporting legs broken away to foreshorten, FIGURE 2 is a perspective view of the grill frame unit, as viewed from below, FIGURE 3 is a perspective view of the fuel compartment divider or partition, which is freely movable within the assembly, FIGURE 4 is a sectional view taken along the plane of the line 4—4 in FIGURE 1, FIGURE 5 is a sectional view taken along the plane of the line 5—5 of FIGURE 4, FIGURE 6 is a view taken along the line 6—6 of FIGURE 5 showing details of the adjusting screw and gearing and their supporting bracket, FIGURE 7 is a fragmentary view, in perspective, of a portion of the grill frame illustrating the removable feature of the grill rod mounting, and FIGURE 8 is a fragmentary view, in elevation, of a corner of the grill rod frame, somewhat enlarged, showing the hinged cover at one end of the frame.

Referring to the drawings by characters of reference, there is shown, in FIGURES 1, 4 and 5, a grill assembly of oblong, rectangular, box-like form having a flat, horizontal bottom 10, and four vertical walls including two long walls 11, 12 and two short walls 13, 14. The short end walls 13, 14 each carry a pair of mounting brackets 16 in the form of pipe clamping straps, secured as by rivets 17. Brackets 16 each receive a ground-engaging leg 18 which is adjustable in height by sliding movement in the brackets and lockable in position by means of a thumb screw 19 threaded in the bracket. For stability, the brackets are arranged at an angle to the horizontal so that the legs diverge outwardly in the downward direction.

The grill rod frame, shown separately in FIGURE 2, has the same rectangular shape as the fuel box 10—14, and its lateral dimensions are such that it just fits within the top opening of the said box for sliding movement up and down therein. When assembled in the box this frame has a single, central support, and therefore requires a reasonable degree of rigidity. To this end, the hollow, rectangular frame is composed of lengths of channel section stock, including two long sides 21, 22, and two short sides 23, 24. It will be noted that in sides 22, 23 and 24, the channels have their opening on the underside, which is desirable for neatness, and to avoid accumulation of dirt, debris and grease. End 21, however, has its opening on the upper side in conformity with the feature of insertion and removal of the rods. For this purpose, long side 22 has, on its inner face, a series of equally spaced bores 26 through its length, through each of which one end of the round grill rods 28 may be inserted and pushed into contact with the outer wall section. Opposite each of bores 26, in the inner wall section of the opposite frame section 21 is a recess or notch 30 opening from the upper edge of said wall section. When one end of a rod 28 has been lodged in a bore 26 on one side of the frame, the opposite end is simply laid in place in a notch 30, the length of the rod being such as to just clear the outer wall section of the side channel 21. With the rods in place, the top opening of channel 21 is closed by a cover or elongated lock bar 32 hinged through end flanges 33 by pins 34. This cover serves as a keeper for the free ends of the rods and also keeps foreign matter out of the channel.

For its central mounting, the grill rod frame has a pair of downwardly depending, end support flanges 36, secured as by rivets 37 to the inner faces of the respective long sides 21, 22 of the frame. Extending between flanges 36 is a supporting beam 38, secured at its ends by rivets 39, and which, in the form shown, consists of two channel-form or U-straps arranged back-to-back and riveted, and which at its center is formed to provide a collar or socket 40 of frusto-conical shape which receives, and dwells upon, the adjustment or lift rod 42, the latter having a mating frusto-conical upper end 44 for this purpose.

The mounting system for the lift rod 42 comprises a U-form bracket 46 secured by rivets 47 to the underside of bottom 10 of the main box. The center span 47 of the bracket has a bore 48 slidably receiving the threaded, lower end 50 of the lift rod 42, the latter being threadedly received, centrally, through a bevel gear 52 having an integral, cylindrical bearing extension 53 which limits downward movement of the rod 42 by contact with the inner face of the bracket floor 47. Vertical movement of the rod 42 to vary the height of the grill rod frame is accomplished by rotation of bevel gear 52, the latter being held against rotation by a pair of longitudinal grooves 54 cooperating with a pair of tongues 56 on the bracket bottom 47 extending radially inwardly of the bore 48. Rotation of the bevel gear 52 is accomplised by a meshing bevel gear 58 pinned to a crank shaft 60 rotatably mounted in one side of bracket 46 and an auxiliary angle bracket 62 secured by rivets 63 to the underside 10 of the main box.

In order to compact the fuel toward one end of the box, as in the later stages of burning, or where a small capacity cooking job is contemplated, the free partition, shown separately in FIGURE 3, is employed. This comprises an upright plate 64 secured by rivets 65 between a pair of back-to-back angle bars 66, the length of the unit being slightly less than the width of the box opening so as to sweep the fuel along the length of the box, or to contain the same within areas which may be varied along the length of the box. This containment of the fuel is clearly shown in FIGURE 4, the charcoal brickets being designated by the numeral 68. With the burning area thus isolated, it is feasible to remove some of the grill rods over the empty part of the box so as to provide a recessed storage for food or articles, and wherein food may be kept warm with greater efficiency and to any desired degree.

In addition to features already discussed herein, the rectangular, oblong shape affords greater efficiency as to utilization of working surface, in contradiction to a circular grill, and the flat bottom of the fuel box renders the rearrangements of the fuel heap easier to accomplish and less readily disturbed, in contrast with dished fuel beds.

While a certain prefered embodiment has been shown and described, the same is not intended as limiting, since various modifications will be suggested to those skilled in the art, in the light of this disclosure, and the invention should not, therefore, be deemed as limited except as shall appear from the spirit and scope of the appended claims.

I claim:

1. A cooking grill comprising an oblong, rectangular box, open at the top, a rectangular frame with central opening closely fitted in the opening of said box for sliding movement depthwise thereof, said frame comprising four integrally-connected channel-section elements the two end elements and one of the side elements opening downwardly, the second side element opening upwardly, there being a series of equally spaced bores through the inner upstanding wall of said one side element, there also being a series of notches in the upper edge of the upstanding inner wall of said second side element, each said notch being positioned directly opposite a respective one of said bores, a plurality of grill rods, each having one end received in one of said bores, and the other end disposed in a corresponding opposite notch, an elongated lock bar having tabs at its ends, each connected to a respective end of said second side element and mounting said lock bar in parallel relation with said second side element, for pivotal movement about an axis parallel thereto, from a first position securing all said rods against removal, each from its respective notch, to a second position about said axis freeing all said rods for removal, said lock bar being at least as wide as said second side element and, when in its said first position, completely covering the upwardly-open channel of said second side element, a pair of brackets attached to the respective side elements of said frame, medially thereof, and extending downwardly therefrom, a beam attached to and extending between the lower distil ends of said brackets, and having a vertical central socket of frusto-conical form, bracket means fixed to and depending from the bottom of said box and having a central bore, a lift rod having a threaded, lower end slidably received in said bore and a fursto-conical upper end received in said socket to form the sole support for said frame within said box, means for limiting said lift rod to vertical translation only, a first bevel gear threaded on said lift rod within said bracket means, and a crank shaft journaled in said bracket means, and a second bevel gear fixed to said shaft and meshing with said first bevel gear.

2. A cooking grill comprising an oblong, rectangular box, open at the top, a rectangular frame with central opening closely fitted in the opening of said box for sliding movement depthwise thereof, said frame comprising channel-section elements opening downwardly on the two short ends and one of the long sides, and opening upwardly on the other of said long sides, a series of equally spaced bores through the inner wall of said one of said long sides, a series of notches in the upper edge of the inner wall of said other of said long sides, each arranged directly opposite a respective one of said bores, a plurality of grill rods, each with one end received in one of said bores, and the other end resting in the corresponding notch opposite said one of said bores, an elongated bar having end tabs pivoted to the respective ends of said other of said long sides for pivotal movement about an axis parallel to said bar and long side, from a first position securing all said rods, each in its respective notch, to a second position simultaneously freeing all said rods for removal from said frame, said elongated bar being at least as wide as, and when in its said first position, completely covering the upwardly-open channel of said other of said long sides, to thereby perform the duel functions of protecting the upwardly open channel of said other of said long sides against the entrance of foreign matter and securing the grill rods in position, a pair of brackets attached to the respective, long sides of said frame, medially thereof, and extending downwardly therefrom, a beam attached to and extending between the lower distal ends of said brackets, and having a central socket, bracket means fixed to and depending from the bottom of said box and having a central bore, a lift rod slidably received in said central bore and having its upper end received in said socket to form the sole support for said frame, and manually operated means carried by said bracket means and connected with said lift rod to vertically translate said lift rod and frame within and relatively to said box.

3. A cooking grill comprising, a rectangular box open at the top, a rectangular open frame fitting said box for vertical translation therewithin, said frame comprising side and end channel elements, both said end elements and a first side element opening downwardly, the second side element opening upwardly, there being a series of equally-spaced bores through the inner wall of said first side element and a series of equally-spaced notches in the top edge of the inner wall of said second side element, each said notch being opposite a respective one of said bores, a plurality of grill rods each having one end inserted into a respective one of said bores and its other end resting in a corresponding one of said notches and with its ends in substantially abutting relation with the outer walls of said side elements, respectively, an elongated cover bar connected at its ends to the corresponding ends of said second side element, for pivotal movement about an axis parallel with said bar and second side element, from a first position extending over and across the contiguous ends of all said rods to secure each in its respective notch, to a second position simultaneously freeing all said rods for lifting from said second side element and removal from said frame, said cover bar being at least as wide as said second side element and, when in its said first position, completely covering the upwardly-open channel of said second side element, a pair of brackets each fixed with and depending from the central portion of a respective one of said side elements, within said box, a normally horizontal beam secured at its ends to and interconnecting the distal lower ends of said brackets, a lift rod extending upwardly and slidably through an opening in the bottom of said box and engaging said beam centrally thereof to support said frame, and manually-operable means carried by the lower surface of the bottom of said box and engaging said lift rod, to vertically adjust said frame in and relatively to said box.

4. A cooking grill comprising a rectangular box open at the top, a rectangular open frame fitting said box for vertical sliding translation therewithin, said frame comprising interconnected channel elements, the two end elements and a first side element opening downwardly and the second side element opening upwardly, a series of equally-spaced bores through the inner wall of said first side element, a series of notches in the upper edge of the inner wall of said second side element, each said notch being opposite a respective one of said bores, a series of grill rods each having one end in a respective one of said bores and its other end in a corresponding one of said notches, an elongated cover bar connected at its ends to the ends of said second side element, parallel therewith, for pivotal movement about an axis adjacent and parallel with said bar and second side element, from a first position over all the contiguous ends of said rods, to a second position free and clear of all said rods, said bar when in first position preventing removal of all said rods, each from its respective notch, said cover bar being at least as wide as said second side element and, when in its said first position, completely covering the upwardly-open channel of said second side element, and means including a vertical lift rod carried by the bottom of said box, centrally thereof, and extending upwardly through an opening therein, to engage and support said frame within said box for vertical adjustment relatively thereto.

5. In a cooking grill, side and end channel sections rigidly interconnected to form a rectangular frame, said end sections and a first side section opening downwardly, the second side section opening upwardly, there being a plurality of spaced bores in the upstanding inner wall of said first side section, there also being a plurality of spaced notches in the upper edge of the inner wall of said second side section, a plurality of grill rods each having one end removably fitting a respective one of said bores and its other end within a corresponding one of said notches, a cover bar parallel with and having its ends pivotally mounted at the respective ends of said second section, for pivotal movement about an axis parallel with and adjacent said second section, from a first position over and simultaneously securing all said rods each in its respective notch, to a second position free and clear of said rods, said cover bar being at least as wide as said second side section and, when in its said first position, completely covering the upwardly-open channel of said second side section, to protect the same against the entrance of foreign matter and simultaneously to secure all grill rods in position, said cover bar when moved to its said second position, simultaneously freeing all said rods for removal from said frame.

6. A cooking grill as in claim 5, the ends of each said rod terminating closely adjacent the outer wall of the corresponding side section, whereby longitudinal movement of said rods is prevented.

References Cited in the file of this patent
UNITED STATES PATENTS

| | | |
|---|---|---|
| 1,051,453 | Roedde | Jan. 28, 1913 |
| 2,091,488 | Polhemus | Aug. 31, 1937 |
| 2,213,483 | Benson | Sept. 3, 1940 |
| 2,573,115 | Sisto | Oct. 30, 1951 |
| 2,604,842 | Dolce | July 29, 1952 |
| 2,740,395 | Goodwin | Apr. 3, 1956 |
| 2,790,434 | Delfrancia | Apr. 30, 1957 |
| 2,856,502 | Wolf | Oct. 14, 1958 |

FOREIGN PATENTS

| | | |
|---|---|---|
| 559,427 | Germany | Sept. 20, 1932 |
| 183,472 | Switzerland | Aug. 1, 1936 |